United States Patent
Inaba et al.

(10) Patent No.: US 9,461,580 B2
(45) Date of Patent: Oct. 4, 2016

(54) STRUCTURE FOR IMPROVING STRENGTH OF TABULAR PORTION AND SUBSTANTIALLY RECTANGULAR PARALLELEPIPED MEMBER

(71) Applicant: ASAHI KASEI CHEMICALS CORPORATION, Tokyo (JP)

(72) Inventors: Hideyuki Inaba, Tokyo (JP); Cuong Vu Manh, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 55 days.

(21) Appl. No.: 14/399,319

(22) PCT Filed: Sep. 24, 2012

(86) PCT No.: PCT/JP2012/074444
§ 371 (c)(1),
(2) Date: Nov. 6, 2014

(87) PCT Pub. No.: WO2013/175651
PCT Pub. Date: Nov. 28, 2013

(65) Prior Publication Data
US 2015/0114955 A1   Apr. 30, 2015

(30) Foreign Application Priority Data

May 22, 2012 (JP) ................. 2012-116938

(51) Int. Cl.
*H02G 3/12* (2006.01)
*H02S 40/34* (2014.01)
*F01M 11/00* (2006.01)

(52) U.S. Cl.
CPC ........... *H02S 40/34* (2014.12); *F01M 11/0004* (2013.01); *H02G 3/12* (2013.01); *F01M 2011/002* (2013.01); *F01M 2011/0008* (2013.01); *F01M 2011/0091* (2013.01)

(58) Field of Classification Search
CPC ........ H02S 40/34; H02G 3/12; H02G 3/081; H02B 1/46; F02F 7/00; B65D 11/26; B65D 11/24; B65D 11/22

USPC ......... 220/3.8, 3.2, 3.9, 3.92, 213, 241, 315, 220/324, 623, 608
See application file for complete search history.

(56) References Cited

U.S. PATENT DOCUMENTS 4,061,241 A * 12/1977 Retelny ................... B65D 1/34
206/508
2003/0015539 A1 1/2003 Hayes et al.
(Continued)

FOREIGN PATENT DOCUMENTS

DE   102010023773   12/2011
DE   102010037465   3/2012
(Continued)

OTHER PUBLICATIONS

European Search Report for EP12877490.8, dated May 13, 2015.
(Continued)

*Primary Examiner* — Robert J Hicks
*Assistant Examiner* — Kareen Thomas
(74) *Attorney, Agent, or Firm* — Greenblum & Bernstein, P.L.C.

(57) ABSTRACT

A polygon in a tabular portion includes first and second axes of symmetry substantially orthogonal to each other. A top surface of the tabular portion has a swelling portion with an outline that is line-symmetric with respect to the first and second axes of symmetry. In a lateral half portion of the outline, a short-side side crest portion that is convex toward the polygonal outline in the direction of the first axis of symmetry, concave corner-side trough portions connected to each end of the short-side side crest portion and long-side side crest portions that are connected to each corner-side trough portion and convex toward the polygonal outline are formed. On one of a top surface and an undersurface of the swelling portion, a pair of lateral ribs or a pair of longitudinal ribs that spreads toward the polygonal outline and transversely crosses the swelling portion is formed.

26 Claims, 11 Drawing Sheets

(56) References Cited

U.S. PATENT DOCUMENTS

| | | | |
|---|---|---|---|
| 2003/0147204 A1 | 8/2003 | Koike et al. | |
| 2010/0162988 A1 | 7/2010 | Enokida | |
| 2010/0170899 A1* | 7/2010 | Mithal | B65D 43/0212 |
| | | | 220/260 |
| 2010/0308055 A1* | 12/2010 | Sams | A61B 19/026 |
| | | | 220/324 |
| 2011/0232963 A1 | 9/2011 | Kono et al. | |
| 2011/0244719 A1 | 10/2011 | Xue et al. | |
| 2012/0248116 A1* | 10/2012 | Smyers | B65D 53/02 |
| | | | 220/324 |
| 2013/0228657 A1 | 9/2013 | Sprenger et al. | |

FOREIGN PATENT DOCUMENTS

| | | |
|---|---|---|
| JP | 4-132445 | 12/1992 |
| JP | 2003-229516 | 8/2003 |
| JP | 2004-178425 | 6/2004 |
| JP | 2007-288930 | 11/2007 |
| JP | 2010-123933 | 6/2010 |
| JP | 2010-151103 | 7/2010 |
| JP | 2012-64874 | 3/2012 |

OTHER PUBLICATIONS

International Search Report from Appl. No. PCT/JP2012/074444 having a mail date of Dec. 18, 2012.

International Preliminary Report on Patentability from Appl. No. PCT/JP2012/074444 having a mail date of Dec. 18, 2012.

* cited by examiner

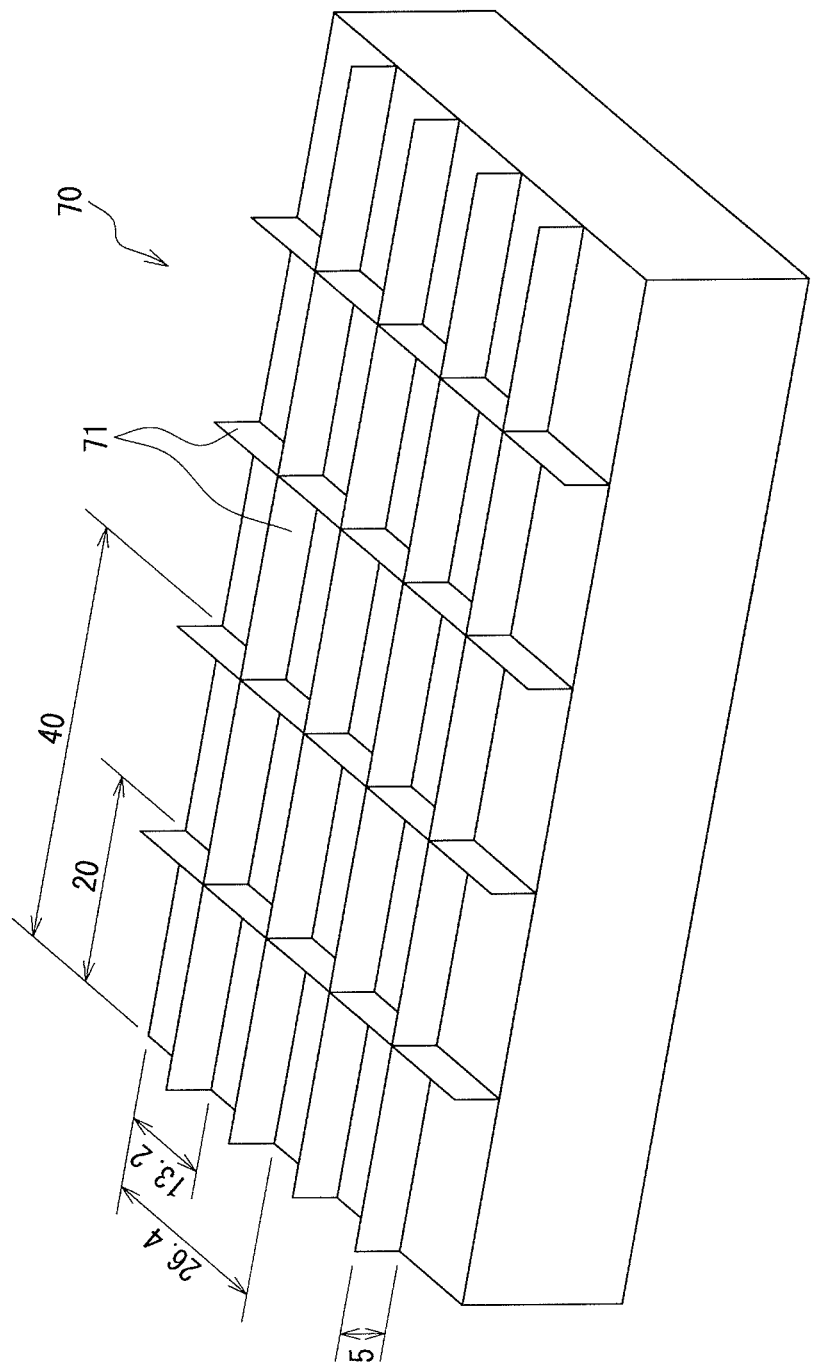

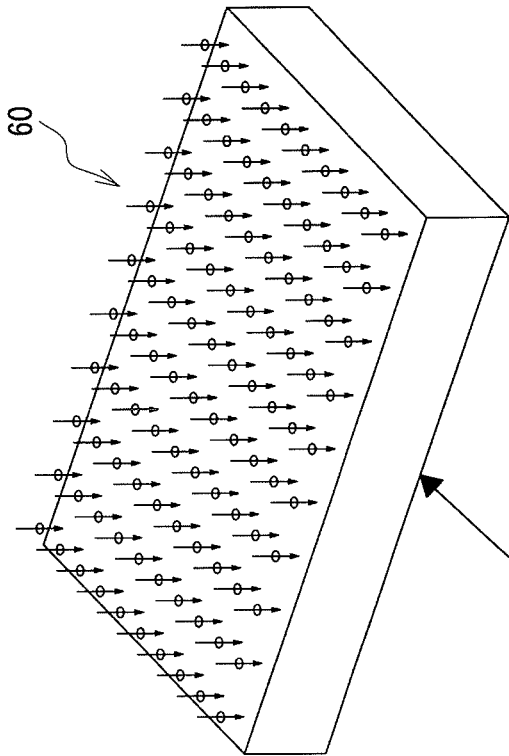
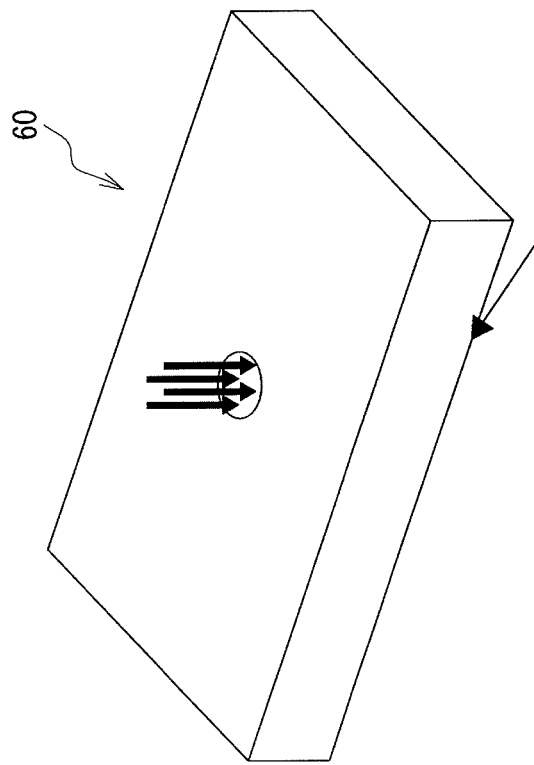
Fig. 7(A)
Fig. 7(B)

STRUCTURE FOR IMPROVING STRENGTH OF TABULAR PORTION AND SUBSTANTIALLY RECTANGULAR PARALLELEPIPED MEMBER

TECHNICAL FIELD

The present invention relates to a structure for improving the strength of a substantially polygonal (four or more corners) tabular portion typified by a substantially rectangular tabular portion that has a short side extending in a longitudinal direction and a long side extending in a lateral direction.

BACKGROUND ART

Conventionally, a junction box of a photovoltaic power generation module is constructed of an upper case and a lower case, and an electronic circuit is accommodated therein. The upper case of this kind is generally made up of a substantially rectangular parallelepiped member whose lower part is opened or simply made up of a substantially rectangular tabular member (e.g., see Patent Documents 1 and 2).

Substantially rectangular parallelepiped members whose upper part or lower part is opened are used not only for a junction box but also for other industrial parts such as an oil pan of an engine and a waterproof pan for placing a washing machine.

Such substantially rectangular parallelepiped members are required to have a certain degree of strength depending on their target industrial parts. For example, since a junction box may be installed outdoors, its substantially rectangular tabular portion is required to have the strength resistant to a load from the outside (e.g., collision load of flying objects such as hail). Conventionally, various efforts have been made to secure the strength, including increasing the thickness of the tabular portion, modifying the material of the tabular portion, and the like.

RELATED ART REFERENCES

Patent Documents

Patent Document 1: Japanese Patent Application Laid-Open No. 2007-288930
Patent Document 2: Japanese Patent Application Laid-Open No. 2010-123933

SUMMARY OF THE INVENTION

Problem to be Solved by the Invention

However, in the method that improves the material of the tabular portion, the material cost may increase. On the other hand, the method that increases the thickness of the tabular portion not only cannot meet the need for space saving but also uses more material. For example, when an attempt is made to replace a conventional metal part by a resin part to place prime importance on a weight reduction, if the thickness of the resin part is increased to keep the same strength as that of the metal part, more resin material is used, which may prevent a sufficient weight reduction depending on the situation. From the standpoint of resource saving, it is desirable to provide the tabular portion with strength by using the smallest possible amount of resin material and still make the strength less susceptible to the difference in material.

The present invention has been implemented in view of the above-described background, and it is an object of the present invention to provide a structure and a substantially rectangular parallelepiped member capable of mechanically and effectively enhancing the strength of a resin-made substantially polygonal (four or more corners) tabular portion.

Means for Solving the Problem

As a result of an FEM analysis carried out by the present inventor, the present inventor discovered that the above-described problems could be solved by forming a swelling portion combining a certain outline and a certain rib configuration on a top surface of a resin-made tabular portion and came to complete the present invention.

That is, a first structure of the present invention is a structure for improving strength of a resin-made substantially polygonal (four or more corners) tabular portion, in which the polygon comprises a first axis of symmetry and a second axis of symmetry which are substantially orthogonal to each other, and a top surface of the tabular portion comprises a swelling portion formed so as to swell upward in a region inside the polygonal outline. The outline of the swelling portion is line-symmetric with respect to the first axis of symmetry and the second axis of symmetry. In a lateral half portion of the outline of the swelling portion, a short-side side crest portion that is convex toward the polygonal outline in a direction of the first axis of symmetry, a corner-side trough portion that is connected to each end of the short-side side crest portion and concave toward the polygonal outline in a region sandwiched between the first axis of symmetry and the second axis of symmetry, and a long-side side crest portion that is connected to an end opposite to the short-side side crest portion of the each corner-side trough portion and convex toward the polygonal outline are formed. At least a pair of lateral ribs that transversely crosses the swelling portion so as to spread toward the polygonal outline or a pair of longitudinal ribs that longitudinally crosses the swelling portion so as to spread toward the polygonal outline is formed on one of a top surface and an undersurface of the swelling portion.

According to the present invention, since a region whose shape is changed (swelling portion) is formed on the top surface of the tabular portion, the overall surface strength of the top surface of the tabular portion improves compared to a case without any such region. Regarding the outline of the swelling portion in particular, since the above-described crest portion and trough portion are combined and the crest portion and trough portion are arranged to be line-symmetric based on the outline of the tabular portion, it is possible to effectively improve impact strength against a pressure on the entire top surface (surface load).

Furthermore, regarding the top surface or undersurface of the swelling portion, impact strength can be improved by a rib configuration.

The above-described improvement of the design of the resin-made tabular portion, that is, a combination of the specific outline of the swelling portion and the specific rib configuration can mechanically and synergistically improve the strength of the tabular portion, and can thereby provide a tabular portion useful for securing impact strength resistant to a point load and surface load even when the smallest possible amount of resin material is used.

The structure preferably includes the lateral ribs and the longitudinal ribs, the lateral ribs are preferably arranged on at least one of the top surface and undersurface of the swelling portion, and the longitudinal ribs are preferably arranged on at least one of the top surface and undersurface of the swelling portion. In this case, the lateral ribs and the longitudinal ribs preferably cross each other. This can effectively improve the impact strength against a point load on the swelling portion.

According to a preferred aspect of the present invention, the polygon is preferably a rectangle whose short side extends parallel to the second axis of symmetry and whose long side extends parallel to the first axis of symmetry. In this case, the short-side side crest portion is preferably convex toward the center of the short side. The corner-side trough portion is preferably concave toward the corner portion at which the short side and the long side cross each other. Moreover, the long-side side crest portion is preferably convex toward the long side. Furthermore, the pair of lateral ribs are preferably arranged so as to be line-symmetric with respect to the first axis of symmetry, and further preferably transversely crosses the swelling portion so as to spread toward the short side. Similarly, the pair of longitudinal ribs are preferably arranged so as to be line-symmetric with respect to the second axis of symmetry, and preferably longitudinally crosses the swelling portion so as to spread toward the long side.

Furthermore, a second structure of the present invention is a structure for improving strength of a resin-made substantially rectangular tabular portion whose short side extends in a longitudinal direction and whose long side extends in a lateral direction, in which a top surface of the tabular portion includes a swelling portion formed so as to swell upward in a region inside the substantially rectangular outline, the outline of the swelling portion is line-symmetric with respect to a longitudinal center line and a lateral center line, and in a lateral half portion of the outline of the swelling portion, a short-side side crest portion that is convex toward the center of the short side, a corner-side trough portion that is connected to each end of the short-side side crest portion and concave toward the corner portion at which the short side and the long side cross each other, and a long-side side crest portion that is connected to the each corner-side trough portion and convex toward the long side, are formed. On one of a top surface and an undersurface of the swelling portion, at least a pair of lateral ribs that are arranged so as to be line-symmetric with respect to the lateral center line and transversely crosses the swelling portion so as to spread toward the short side and a pair of longitudinal ribs that are arranged so as to be line-symmetric with respect to the longitudinal center line and longitudinally crosses the swelling portion so as to spread toward the long side, are formed, and the lateral ribs and the longitudinal ribs cross each other.

According to the present invention, since a region whose shape is changed (swelling portion) is formed on the top surface of the tabular portion, the surface strength of the top surface of the tabular portion as a whole improves compared to a case without any such region. Regarding the outline of the swelling portion in particular, since the above-described crest portion and trough portion are combined and arranged so as to be line-symmetric based on the outline (short side, long side and corner portion) of the tabular portion, it is possible to effectively improve impact strength against a pressure on the entire top surface (surface load).

Furthermore, the strength of the top surface or undersurface of the swelling portion can be improved through a rib configuration. Particularly, since the lateral ribs and the longitudinal ribs are arranged so as to be line-symmetric in the above-described bent (spread) form and made to cross each other in the form of transversely and longitudinally crossing the swelling portion, it is possible to effectively improve the impact strength against a point load on the swelling portion.

The above-described improvement of the design of the resin-made tabular portion, that is, the combination of the specific outline and the specific rib configuration of the swelling portion can mechanically and synergistically improve the strength of the tabular portion, and can thereby provide a tabular portion useful for securing impact strength resistant to a point load and a surface load even when the smallest possible amount of resin material is used.

In the case of the second structure of the present invention and the first structure of the present invention, when the polygon is a substantial rectangle, the structure preferably assumes the following aspects.

That is, the long-side side crest portion is preferably most convex toward the long side at a position apart by a length of approximately ⅓ of the length of the long side from the short side. More preferably, in a longitudinal half portion of the outline of the swelling portion, the long-side side crest portion located in one lateral half portion of the outline and the long-side side crest portion located in the other lateral half portion of the outline are connected together with the long-side side inter-crest portion, and the long-side side inter-crest portion is preferably convex toward the center of the long side by an amount of protrusion smaller than that of these long-side side crest portions.

According to such a configuration, it is possible to more effectively improve the impact strength.

In a region outside the swelling portion, a first outside rib that extends so as to connect both ends of the lateral ribs to at least one of the short side and the long side and a second outside rib that extends so as to connect both ends of the longitudinal ribs to the long side are preferably formed.

According to this configuration, since the longitudinal ribs and lateral ribs located in the swelling portion are connected to the ribs outside the swelling portion, it is possible to enhance the reinforcement effect through the rib configuration. For example, when a load is applied to the swelling portion, it is possible to make the load propagate through the rib configuration to be released to outside the swelling portion, thus suppressing deformation of the swelling portion.

According to one more preferable aspect, the lateral ribs and the longitudinal ribs are preferably formed on the undersurface of the swelling portion, and the first outside rib and second outside rib are preferably formed on the top surface of the tabular portion.

According to this configuration, it is possible to widely secure a plane configuration on the top surface of the swelling portion. This is useful when the top surface of the swelling portion is desired to be used as a plane configuration, for example, when a predetermined display of manufacturer name, product name or the like is desired to be shown on the top surface. As a specific example, such a configuration is useful when the tabular portion is used for a cover of a junction box for a photovoltaic power generation module.

According to another more preferred aspect, the lateral ribs and the longitudinal ribs are preferably formed on the top surface of the swelling portion and the first outside rib and the second outside rib are preferably formed on the top surface of the tabular portion.

According to this configuration, it is possible to widely secure a plane configuration on the undersurface of the tabular portion. This configuration is useful when the undersurface of the tabular portion is desired to be used as a plane configuration, for example, when a liquid or the like is not desired to be continuously stored between the ribs of the undersurface. As a specific example, this configuration is useful when the tabular portion is used for a base of an oil pan.

In the region inside the swelling portion, a plurality of first intermediate ribs for connecting the lateral ribs, a plurality of second intermediate ribs for connecting the longitudinal ribs and a plurality of third intermediate ribs for connecting the lateral ribs and the longitudinal ribs are preferably formed.

According to this configuration, since the rib configuration is stretched around the region inside the swelling portion, it is possible to further enhance the reinforcement effect of the swelling portion by the lateral ribs and longitudinal ribs.

More preferably, a fourth intermediate rib may be formed in the region inside the swelling portion, which extends so as to connect the outline of the swelling portion at a position apart from the lateral ribs and the longitudinal ribs.

According to this configuration, it is possible to reinforce the region of the swelling portion to which the reinforcement effect by the lateral ribs and longitudinal ribs does not fully extend.

A corner rib is preferably formed in the region outside the swelling portion, which extends so as to connect the short side and the long side.

According to this configuration, it is possible to also reinforce the corner portion of the tabular portion. The corner rib may include at least part of the above-described first outside rib.

More preferably, a bridge rib that extends so as to connect the corner rib and the corner-side trough portion may be formed in a region outside the swelling portion.

According to this configuration, it is possible to enhance the reinforcement effect as in the case of the above-described relationship between the longitudinal ribs and the first outside rib. For example, when a load is applied to one of the swelling portion and corner portion, it is possible to make the load propagate through the rib configuration to be released to the other of the swelling portion and the corner portion, which suppresses these parts from deforming. The bridge rib may include at least part of the above-described first outside rib.

The substantially rectangular parallelepiped member of the present invention is provided with the above-described structure of the present invention (structure relating to the substantially rectangular tabular portion), is a substantially rectangular parallelepiped member whose lower part is opened and includes the tabular portion and a peripheral wall portion that extends downward from the perimeter of the tabular portion.

The present invention can provide a substantially rectangular parallelepiped member having a resin-made tabular portion whose impact strength is mechanically and effectively enhanced.

Here, the substantially rectangular parallelepiped member can be, for example, a junction box, oil pan of an engine, waterproof pan for placing a washing machine or various other industrial parts, and is not limited to these examples. Various types of material can be used as a resin material used to mold at least part of the substantially rectangular parallelepiped member and those adapted to the use of the substantially rectangular parallelepiped member are preferably used.

For example, when the substantially rectangular parallelepiped member constitutes at least part of an oil pan, the resin is preferably glass fiber reinforced polyamide 66 or polyamide 6. Adopting such resin can exert effects appropriate for the use of a part as an oil pan (impact resistance, heat resistance, creeping property, high rigidity and vibration fatigue property).

Furthermore, when the substantially rectangular parallelepiped member constitutes at least part of a junction box for a photovoltaic power generation module, the resin is preferably modified PPE. This can exert effects appropriate for the use of a part as a junction box (advantageous in aspects of hydrolysis resistance, flame retardancy, dimensional accuracy and electric characteristic).

BRIEF DESCRIPTION OF DRAWINGS

FIG. 5 is a diagram illustrating a grid shaped analysis model according to a comparative example.

FIG. 6(A) is a perspective view illustrating a top surface side of a cover and FIG. 6(B) is a perspective view illustrating an undersurface side of the cover.

FIGS. 7(A) and 7(B) are a diagram illustrating an analysis condition, FIG. 7(A) is a diagram illustrating a case where a point load is inputted and FIG. 7(B) is a diagram illustrating a case where a plane load is inputted.

DESCRIPTION OF THE EMBODIMENTS

Preferred embodiments of the present invention will be described with reference to the accompanying drawings. Position-related terms such as "upper" and "lower" used in the following description are relative to a case where a tabular portion is placed on an installation surface with a swelling portion facing up.

First Embodiment

First, with reference to FIGS. 1 to 3, a cover of a junction box for a photovoltaic power generation module will be described, to which a structure for improving strength of a substantially rectangular tabular portion is applied.

Figure 1:
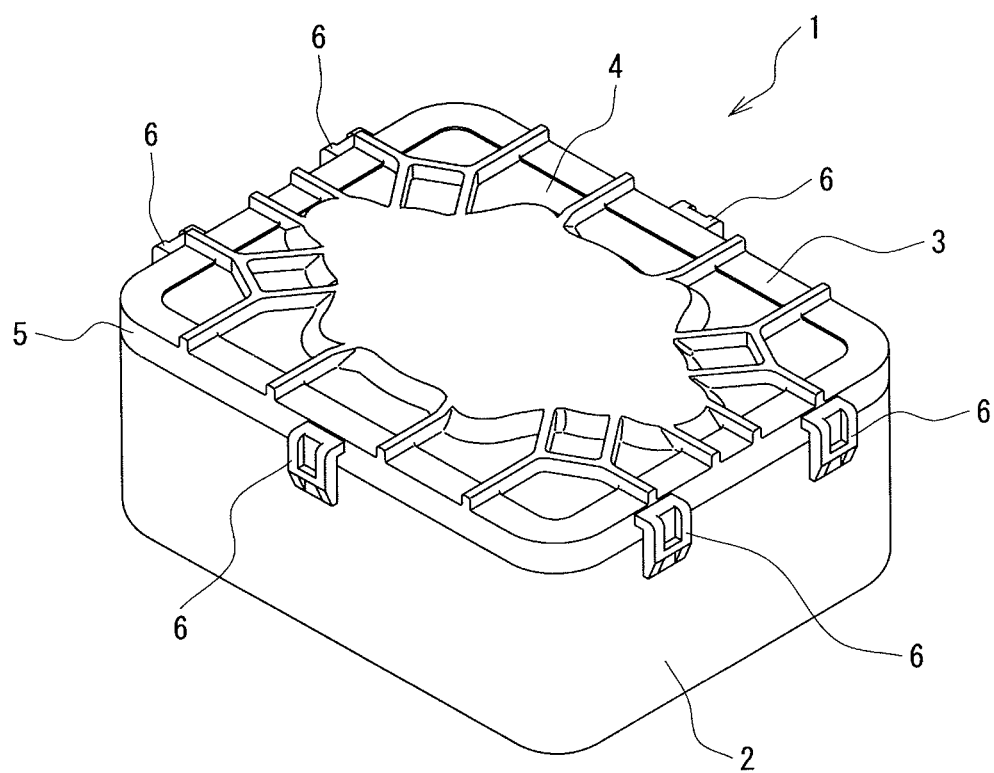
FIG. 1 is a perspective view illustrating a junction box for a photovoltaic power generation module according to a first embodiment.

As shown in FIG. 1, a junction box 1 for a photovoltaic power generation module is provided with a junction box body 2 which is a lower case and a cover 3 which is an upper case. The junction box body 2 has a box shape whose top surface is opened and an electronic circuit is accommodated therein. The junction box body 2 is provided with a connection section between a cable for the photovoltaic power generation module and an outside connection cable so that electric power generated in the photovoltaic power generation module is distributed to an outside device or the like. The cover 3 is intended to cover the opening of the junction box body 2 and is provided with a substantially rectangular tabular portion 4 as a region that covers the opening. The cover 3 is provided with a peripheral wall portion 5 that extends downward from the perimeter of the tabular portion 4. That is, the cover 3 is configured as a substantially rectangular parallelepiped member whose lower part is opened. Fixing portions 6 to fix the cover 3 to the junction box body 2 are provided at each of the front, back, left and right positions of the peripheral wall portion 5.

Here, the structure of the cover 3 of the present embodiment is not particularly limited as long as it has the substantially rectangular tabular portion 4. For example, the cover 3 may also be a substantially rectangular tabular member instead of the substantially rectangular parallelepiped member shown in FIG. 1. The "substantially rectangular" only requires that the four sides be composed of two short sides and two long sides, and neither means that the angle of the corner portion where one short side and one long side cross each other should be limited to 90 degrees nor means that part of one short side or one long side should be limited to straight line.

Resin is used as the material of the cover 3. Of resin, modified PPE (polyphenylene ether) is preferably used from the standpoint of hydrolysis resistance, flame retardancy, dimensional accuracy and electric characteristics.

Figure 2A:
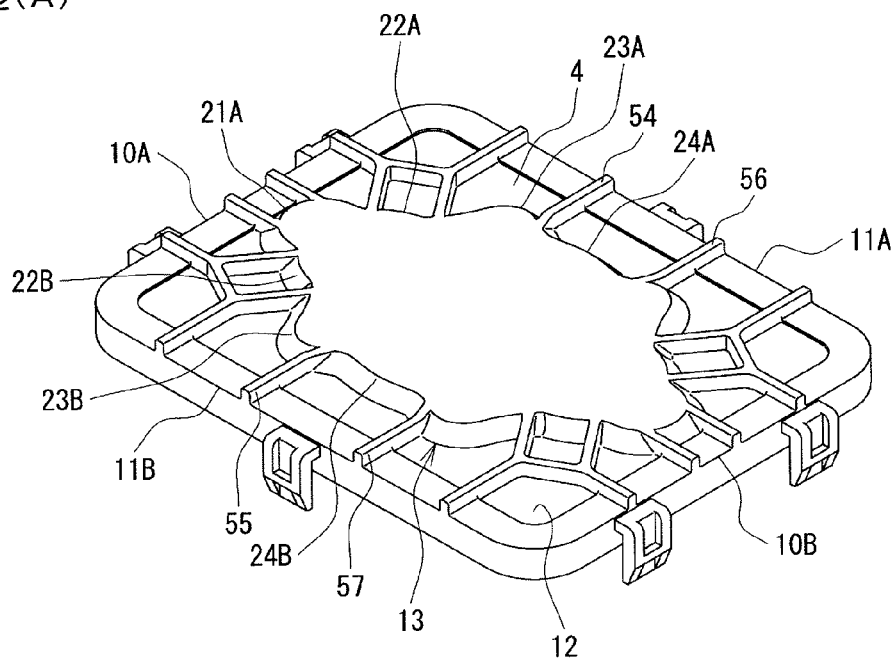
FIG. 2(A) is a perspective view illustrating a top surface side of a cover of the junction box in FIG. 1
Figure 2B:
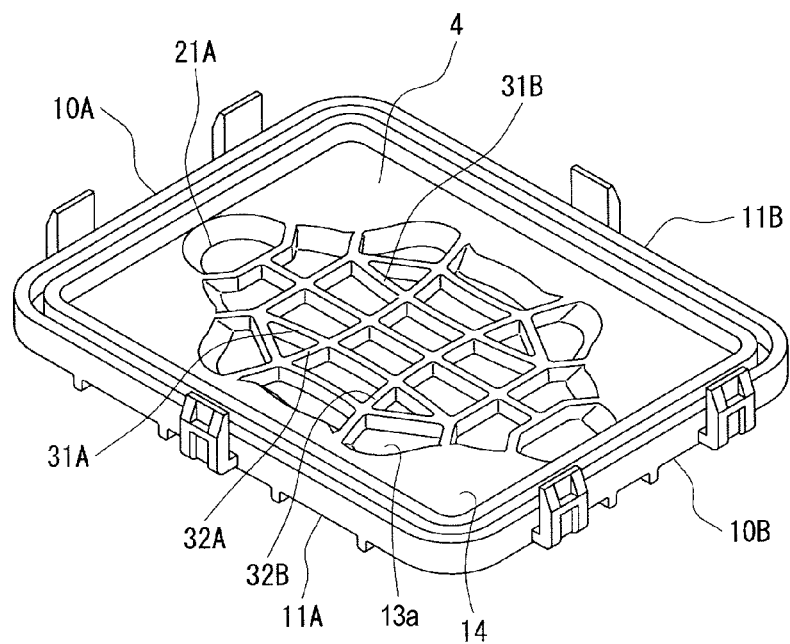
FIG. 2(B) is a perspective view illustrating an undersurface side of the cover of the junction box in FIG. 1.
Figure 3A:
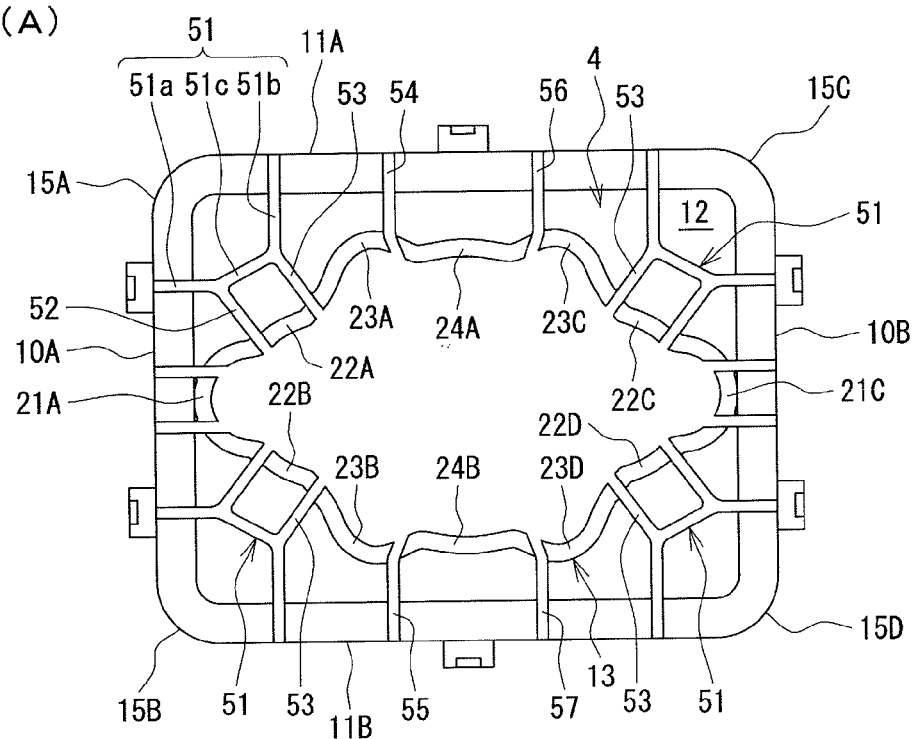
FIG. 3(A) is a plan view illustrating the top surface side of the cover of the junction box in FIG. 1

As shown in FIGS. 2 and 3, the tabular portion 4 has a substantially rectangular shape with short sides 10A and 10B extending in a longitudinal direction and long sides 11A and 11B extending in a lateral direction. On a top surface 12 of the tabular portion 4, a swelling portion 13 is formed so as to swell upward in a region inside the substantially rectangular outline of the tabular portion 4. When viewed from the undersurface 14 side of the tabular portion 4 (see FIG. 2(B)), the swelling portion 13 appears as a concave form on the undersurface 14. The swelling portion 13 is formed in the major portion of the tabular portion 4 centered on a central area of the tabular portion 4, and the area occupied by the swelling portion 13 in the tabular portion 4 is approximately 50%.

The outline and rib configuration of the swelling portion 13 are line-symmetric with respect to a longitudinal center line (second axis of symmetry) and a lateral center line (first axis of symmetry). The longitudinal center line is a vertical bisector of the long sides 11A and 11B. The lateral center line is a vertical bisector of the short sides 10A and 10B.

First, the outline of the swelling portion 13 will be described.

In a left half portion (lateral half portion) of the outline of the swelling portion 13, a short-side side crest portion 21A which is convex toward the center of the short side 10A, corner-side trough portions 22A and 22B which are concave toward corner portions 15A and 15B which are connected to each end of the short-side side crest portion 21A and where the short side 10A crosses the long sides 11A and 11B, and long-side side crest portions 23A and 23B which are connected to respective corner-side trough portions 22A and 22B and convex toward the long sides 11A and 11B are formed. The short-side side crest portion 21A as a whole has a substantially semicircular outline whose crest is located on a lateral center line. The long-side side crest portions 23A and 23B are most convex toward the long sides 11A and 11B respectively at positions apart by a length of approximately ⅓ of the length of the long side 11A and 11B from the short side 10A, and are located on the left side of the longitudinal center line. Note that the right half portion of the outline of the swelling portion 13 also has a similar configuration, and the corresponding portions are assigned reference characters C and D instead of A and B, and description thereof will be omitted here.

In the upper half portion (longitudinal half portion) of the outline of the swelling portion 13, the long-side side crest portion 23A and a long-side side crest portion 23C are connected with a long-side side inter-crest portion 24A. The long-side side inter-crest portion 24A is convex toward the center of the long side 11A by a smaller amount of protrusion than that of the long-side side crest portion 23A and 23C and a crest thereof is located on a longitudinal center line. In the lower half portion of the outline of the swelling portion 13, the long-side side crest portion 23B and a long-side side crest portion 23D are likewise connected with a long-side side inter-crest portion 24B.

Next, a rib configuration of the swelling portion 13 will be described.

The rib configuration of the swelling portion 13 can be roughly divided into a rib configuration (31A, 31B, 32A, 32B, and 41 to 45) in a region inside the outline of the swelling portion 13 and a rib configuration (51 to 57) in a region outside the outline of the swelling portion 13. Hereinafter, these rib configurations will be described in order.

The inside rib configuration (31A, 31B, 32A, 32B, and 41 to 45) is formed on an undersurface 13a of the swelling portion 13 which is one step lower than the undersurface 14 of the tabular portion 4. Of the inside rib configuration (31A, 31B, 32A, 32B, and 41 to 45), a pair of lateral ribs 31A and 31B and a pair of longitudinal ribs 32A and 32B are designed to effectively improve impact strength against a point load on the swelling portion 13. The lateral ribs 31A and 31B and the longitudinal ribs 32A and 32B cross each other in the central area of the swelling portion 13.

Figure 3B:
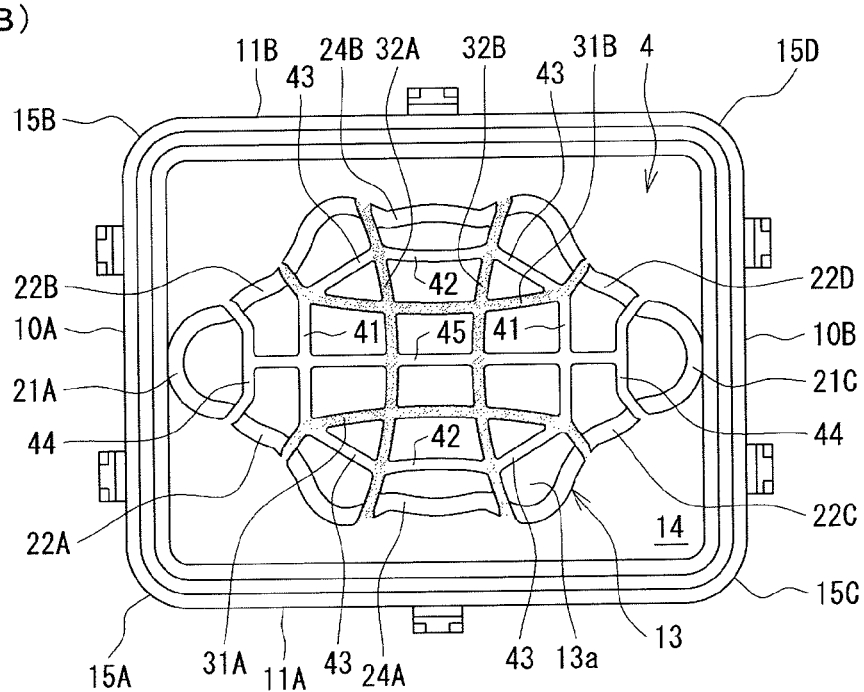
FIG. 3(B) is a bottom view illustrating the undersurface side of the cover of the junction box in FIG. 1.

In the following description, of the inside rib configuration (31A, 31B, 32A, 32B, and 41 to 45), the lateral ribs 31A and 31B and the longitudinal ribs 32A and 32B may be called "basic ribs" and the other ribs 41 to 45 may be called "supplementary ribs." In FIG. 3(B), the lateral ribs 31A and 31B and longitudinal ribs 32A and 32B which are the basic ribs are colored in gray to secure viewability of the plurality of ribs.

The lateral ribs 31A and 31B are arranged so as to be line-symmetric with respect to the lateral center line and transversely cross the swelling portion 13 so as to spread toward the short sides 10A and 10B. In other words, the lateral ribs 31A and 31B as a whole extend so as to bend in a substantially drum-like shape in bottom view, both ends of the lateral rib 31A reach the corner-side trough portions 22A and 22C and both ends of the lateral rib 31B reach the corner-side trough portions 22B and 22D.

The longitudinal ribs 32A and 32B are arranged so as to be line-symmetric with respect to the longitudinal center line, and longitudinally cross the swelling portion 13 so as to spread toward the long sides 11A and 11B. In other words, the longitudinal ribs 32A and 32B as a whole extend so as to bend in a substantially drum-like shape in bottom view, both ends of the longitudinal ribs 32A and 32B reach the long-side side inter-crest portions 24A and 24B.

Two intermediate ribs 41 are formed at positions outside the longitudinal ribs 32A and 32B so as to connect the lateral ribs 31A and 31B together at two locations. Two intermediate ribs 42 are formed at positions outside the lateral ribs 31A and 31B so as to connect the longitudinal ribs 32A and 32B together at two locations. Intermediate ribs 43 are made up of a total of four ribs: two ribs connecting the lateral rib 31A and the longitudinal ribs 32A and 32B, and two ribs connecting the lateral rib 31B and the longitudinal ribs 32A and 32B. The intermediate ribs 41, 42 and 43 are interconnected to form an octagonal outline as a whole. The intermediate ribs 44 are made up of a total of two ribs: a rib that extends so as to connect bottom parts at both ends of the short-side side crest portion 21A and a rib that extends so as to connect bottom parts at both ends of the short-side side crest portion 21C, both ribs extending so as to connect the outline of the swelling portion 13 at positions apart from the lateral ribs 31A and 31B and the longitudinal ribs 32A and 32B. Intermediate portions of the two intermediate ribs 44 are connected via a straight line rib 45 positioned on a lateral center line, and this straight line rib 45 is also connected to the intermediate rib 41 and the longitudinal ribs 32A and 32B.

In this way, in the region inside the swelling portion 13, the supplementary ribs 41 to 45 stretch around in addition to the basic ribs 31A, 31B, 32A and 32B. Of the supplementary ribs, the intermediate ribs 41 to 43 and straight line rib 45 in particular further enhance the reinforcement effect of the swelling portion 13 by the lateral ribs 31A and 31B and longitudinal ribs 32A and 32B, and enhance rigidity thereof. Furthermore, the intermediate ribs 44 reinforce the region of the swelling portion 13 to which the reinforcement effect by the lateral ribs 31A and 31B and the longitudinal ribs 32A and 32B does not fully extend and reinforce rigidity thereof.

Next, the rib configuration (51 to 57) in the region outside the swelling portion 13 will be described.

This outside rib configuration (51 to 57) is formed on the top surface 12 of the tabular portion 4 and is line-symmetric with respect to the longitudinal center line and the lateral center line. The height of each rib 51 to 57 is the same as the height of the swelling portion 13.

A corner rib 51 is formed at a corner portion 15A so as to connect the short side 10A and the long side 11A in the region outside the swelling portion 13. The corner rib 51 is made up of a partial rib 51a that extends rightward from the short side 10A, a partial rib 51b that extends downward from the long side 11A and an inclined partial rib 51c that connects the partial rib 51a and the partial rib 51b.

Bridge ribs 52 and 53 extend so as to connect the corner rib 51 and the corner-side trough portion 22A. The bridge rib 52 extends from an inflection point of the corner rib 51 (intersection between the partial rib 51a and the partial rib 51c) toward the corner-side trough portion 22A so as to be connected to the intermediate rib 44 on the undersurface 13a of the swelling portion 13 at the corner-side trough portion 22A. The bridge rib 53 extends from an inflection point of the corner rib 51 (intersection between the partial rib 51b and the partial rib 51c) toward the corner-side trough portion 22A so as to be connected to the lateral rib 31B on the undersurface 13a of the swelling portion 13 at the corner-side trough portion 22A. Though not described in detail, the corner rib 51, and the bridge ribs 52 and 53 are also formed around the corner portions 15B, 15C and 15D likewise.

Here, focusing on the lateral rib 31A, both ends of the lateral rib 31A are connected to the short sides 10A and 10B, and the long side 11A via the corner rib 51 and the bridge rib 53. In this aspect, the same applies to the lateral rib 31B. Therefore, it is understood that the "first outside rib" in Claims is formed of the corner rib 51 and the bridge rib 53 in the present embodiment.

Second outside ribs 54 and 55 extend so as to connect both ends of the longitudinal rib 32A to the long sides 11A and 11B. Furthermore, the second outside ribs 56 and 57 extend so as to connect both ends of the longitudinal rib 32B to the long sides 11A and 11B.

In this way, in the region outside the swelling portion 13, the rib configuration (51 to 57) stretches around. Particularly the corner portions 15A to 15D of the tabular portion 4 where the swelling portion 13, lateral ribs 31A and 31B and longitudinal ribs 32A and 32B are not located can be reinforced by the corner ribs 51. The load on the swelling portion 13 can be released to outside the swelling portion 13 via the first outside ribs (corner rib 51 and bridge rib 53) and the second outside ribs 54 to 57, which enhances the reinforcement effect by the lateral ribs 31A and 31B and longitudinal ribs 32A and 32B and suppresses deformation of the swelling portion 13. Similarly, even when a single load is imposed around the corner portions 15A to 15D, the load can be made to propagate through the bridge ribs 52 and 53 to be released to the swelling portion 13, thus suppressing deformation around the corner portions 15A to 15D.

Next, an FEM analysis of the tabular portion 4 will be described with reference to FIGS. 4 to 8.

Figure 4:
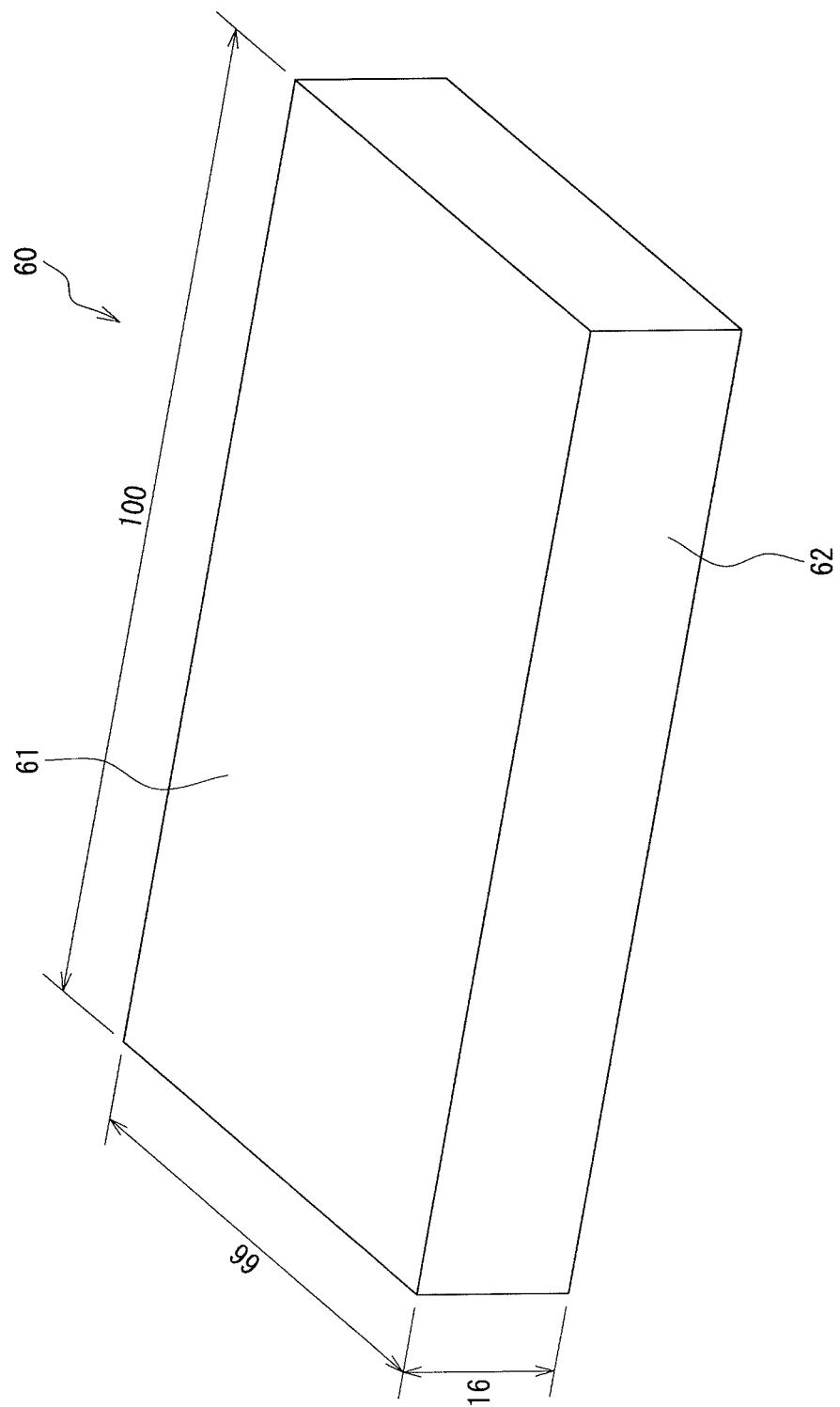
FIG. 4 is a diagram illustrating a base shaped analysis model according to a comparative example.

For a comparison with the present embodiment, FIGS. 4 and 5 illustrate analysis models of a base shape 60 and a grid shape 70 respectively according to comparative examples. The base shape 60 is a substantially rectangular parallelepiped member whose underside is opened, and a tabular portion 61 and peripheral wall portions 62 all have a thickness of 2 mm. However, the thickness thereof is not limited to this size and their preferable thicknesses are 1 to 5 mm. Furthermore, the tabular portion 61 has a width of 100 mm and a depth of 66 mm, and the peripheral wall portion 62 has a height of 16 mm. The grid shape 70 corresponds to the tabular portion 61 of the base shape 60 with a plurality of ribs 71 formed in a grid shape on the top surface of the tabular portion 61. All the ribs 71 have a thickness of 2 mm. The rib 71 has a height of 5 mm, the rib 71 has a pitch of 20 mm in the lateral direction and has a pitch of 13.2 mm in the longitudinal direction.

Figure 6A:
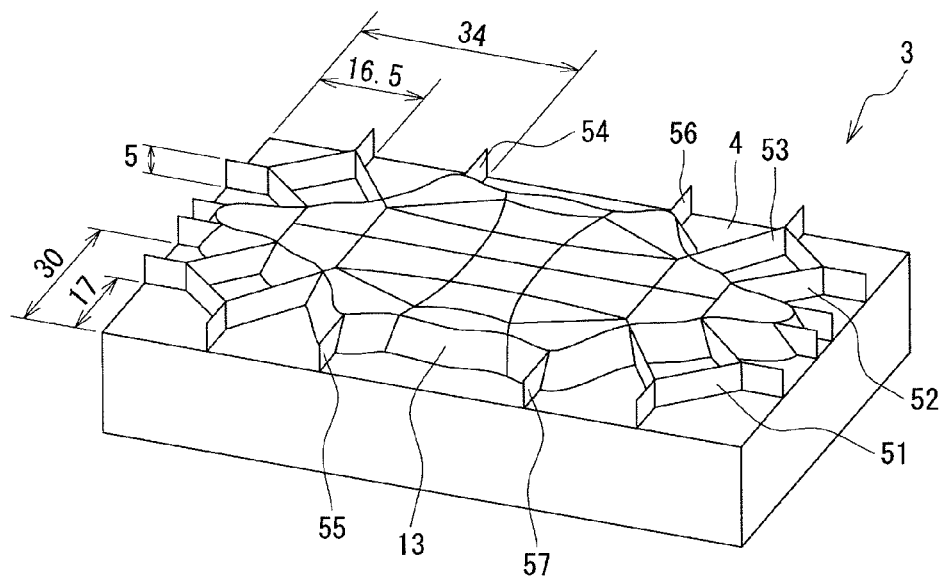
FIGS. 6(A) and 6(B) are a diagram illustrating an analysis model of a tabular portion according to the first embodiment.
Figure 6B:
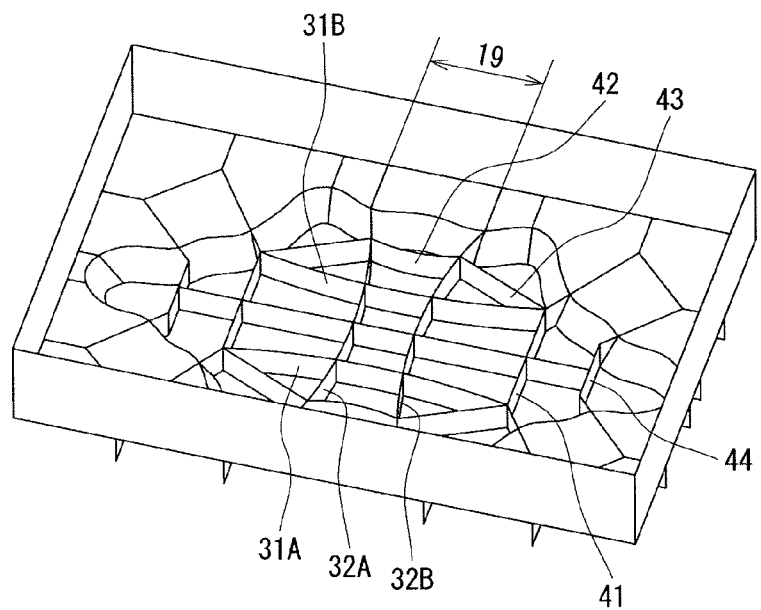

FIG. 6 illustrates an analysis model of the cover 3 having the tabular portion 4 according to the present embodiment. This analysis model corresponds to the base shape 60 in FIG. 4 with the aforementioned swelling portion 13 and the various rib configurations (31A, 31B, 32A, 32B, 41 to 45, and 51 to 57) formed thereon. However, only the second outside ribs 54 to 57 have positions different from those in FIGS. 1 to 4. All the ribs have a thickness of 2 mm and each rib has a height of 5 mm. The thickness and height thereof are not limited to these sizes and a preferable thickness is 1 to 5 mm and each rib preferably has a height of 1 to 5 mm. The crest of the long-side side crest portion 23A is located at a position apart by 34 mm from the short side 10A and the long-side side inter-crest portion 24A has a length of 19 mm.

As shown in FIG. 7, for a case with a point load inputted to the tabular portion (FIG. 7A) and a case with a plane load inputted thereto (FIG. 7B), FEM analyses were performed with the floor completely constrained. In the case of a point load, a load F=200 N was inputted within a range of $\phi 10$ in a central part of the tabular portion. In the case of a plane load, a pressure P=0.3 MPa was inputted over the entire top surface of the tabular portion. Although FIG. 7 illustrates the base shape 60 for convenience, an FEM analyses were performed on the grid shape 70 and the cover 3 of the present embodiment under similar conditions. In the FEM analyses, LEONA 14G33 (modulus of elasticity: 6300 MPa, Poisson's ratio: 0.34) manufactured and sold by Asahi Kasei Corporation was used as the material of the base shape 60, the grid shape 70 and the cover 3 of the present embodiment.

Figure 8:
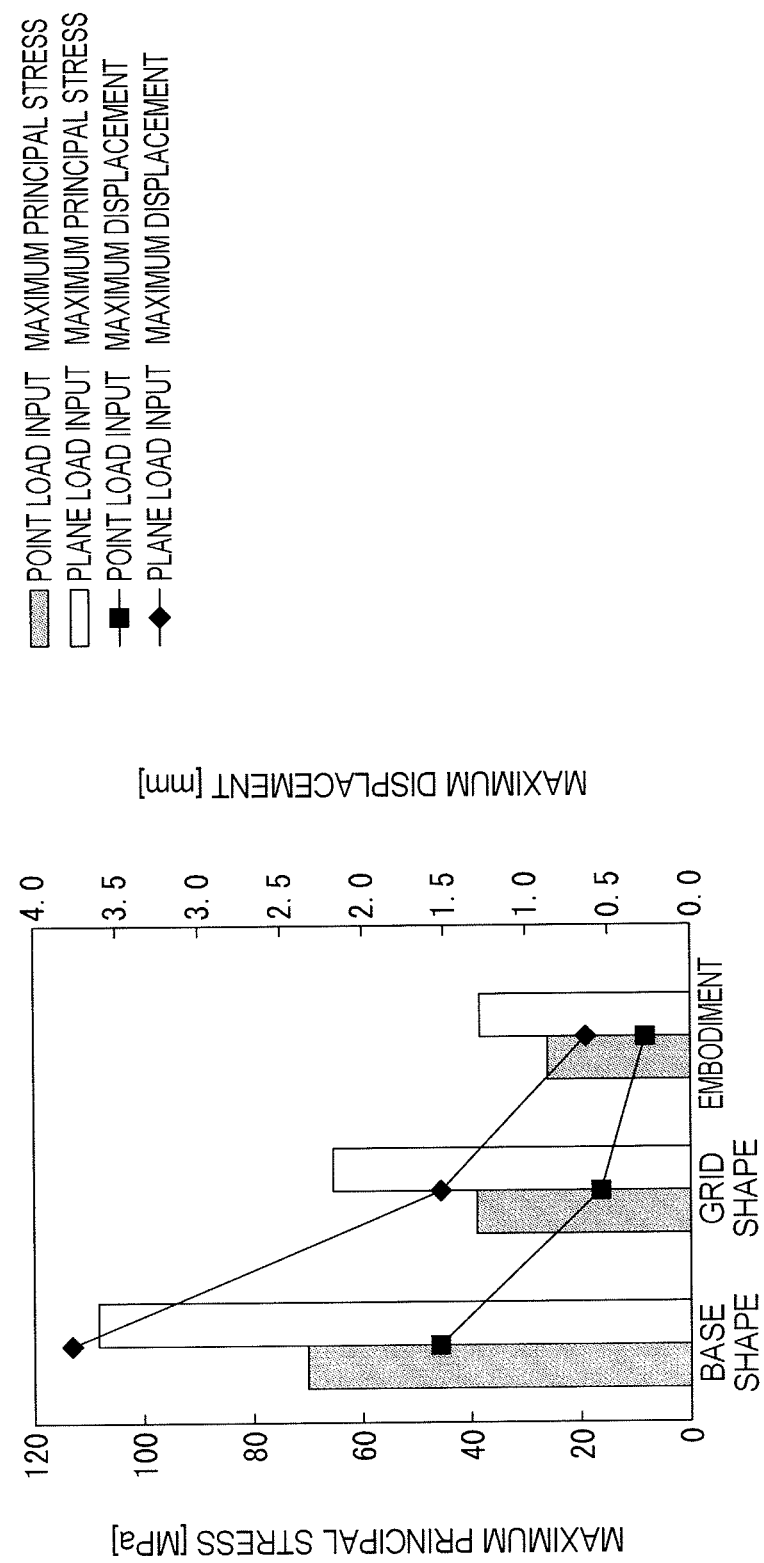
FIG. 8 is a graph illustrating analysis results.

FIG. 8 is a graph illustrating FEM analysis results. As shown in FIG. 8, first of all, in the case of the point load input, maximum principal stress and maximum displacement of the cover 3 of the present embodiment are the smallest. This proves that the cover 3 of the present embodiment has improved impact strength (rigidity) against the point load input more than the base shape 60 and grid shape 70. Next, also in the case of the plane load input, the maximum principal stress and maximum displacement of the cover 3 of the present embodiment are the smallest. This proves that the cover 3 of the present embodiment has improved impact strength (rigidity) against the plane load input more than the base shape 60 and grid shape 70. In this way, the FEM analysis results show that the cover 3 of the present embodiment has exhibited excellent impact strength against the point load input and the plane load input.

Although not described in detail, the present inventor et al. have performed similar FEM analyses on and studied various analysis models in addition to the above-described three analysis models. As a result, it has been confirmed that forming the swelling portion 13 as the present embodiment, which combines at least the aforementioned outline and the basic ribs (lateral ribs 31A and 31B and longitudinal ribs 32A and 32B) on the top surface of the tabular portion 4 would be effective in mechanically and effectively enhancing impact strength of the resin-made tabular portion.

These confirmation results are analyzed as follows. First, since the swelling portion 13 which is a region with a changed shape is formed on the top surface 12 of the tabular portion 4, it is analyzed that the surface strength of the top surface 12 of the tabular portion 4 as a whole has improved compared to the base shape 60 and grid shape 70 where such a region is absent. Furthermore, regarding the outline of the swelling portion 13, the aforementioned crest portion and trough portion are combined and arranged so as to be line-symmetric based on the outline of the tabular portion 4, and therefore it is analyzed that the impact strength against a pressure on the entire top surface 12 (plane load) has effectively improved. Moreover, the lateral ribs 31A and 31B and longitudinal ribs 32A and 32B of the swelling portion 13 are configured line-symmetrically in the aforementioned spread form and they are made to cross each other while transversely and longitudinally crossing the swelling portion 13, and therefore it is analyzed that the impact strength against the point load on the swelling portion 13 has effectively improved.

Therefore, with the tabular portion 4 according to the present embodiment and the cover 3 that includes the tabular portion 4, a combination of the specific outline and basic ribs of the swelling portion 13 can mechanically and synergistically improve the strength of the resin-made tabular portion 4. Thus, even when the smallest possible amount of resin material is used for the tabular portion 4 and cover 3, it is possible to provide the tabular portion 4 and cover 3 useful for securing the impact strength resistant to a point load and plane load.

The embodiment of the present invention has been described so far with reference to the specific examples. The above-described specific examples are illustrative for describing the present invention, and not intended to limit the present invention solely to the embodiment. That is, these specific examples whose design is further modified by those skilled in the art as appropriate also fall within the scope of the present invention as long as they include the features of the present invention. For example, the elements provided for the aforementioned respective specific examples and arrangement, material, shape, sizes and number thereof or the like are not limited to the illustrated ones but can be modified as appropriate.

Figure 9A:
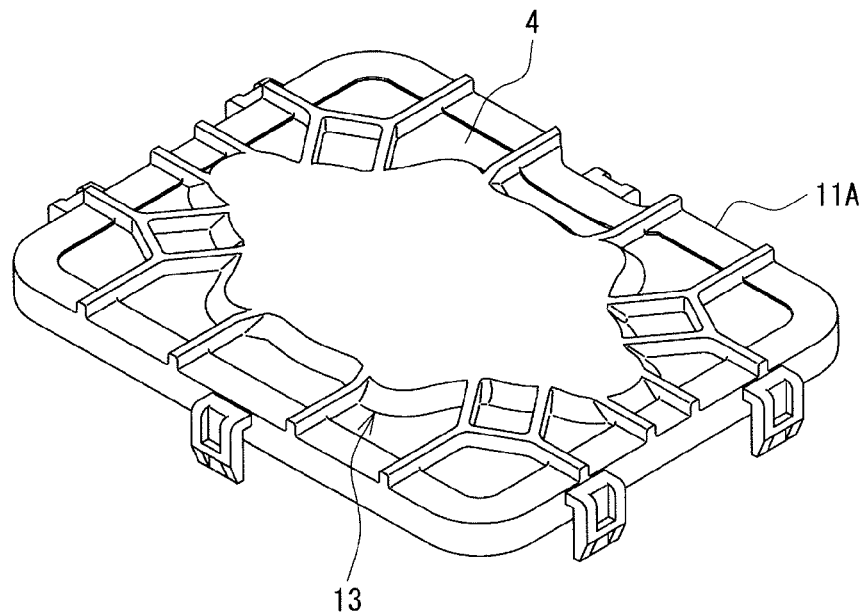
FIG. 9(A) is a perspective view illustrating a top surface side of a cover of a junction box according to a modification and FIG. 9(B) is a perspective view illustrating an undersurface side of the cover of the junction box according to the modification.
Figure 9B:
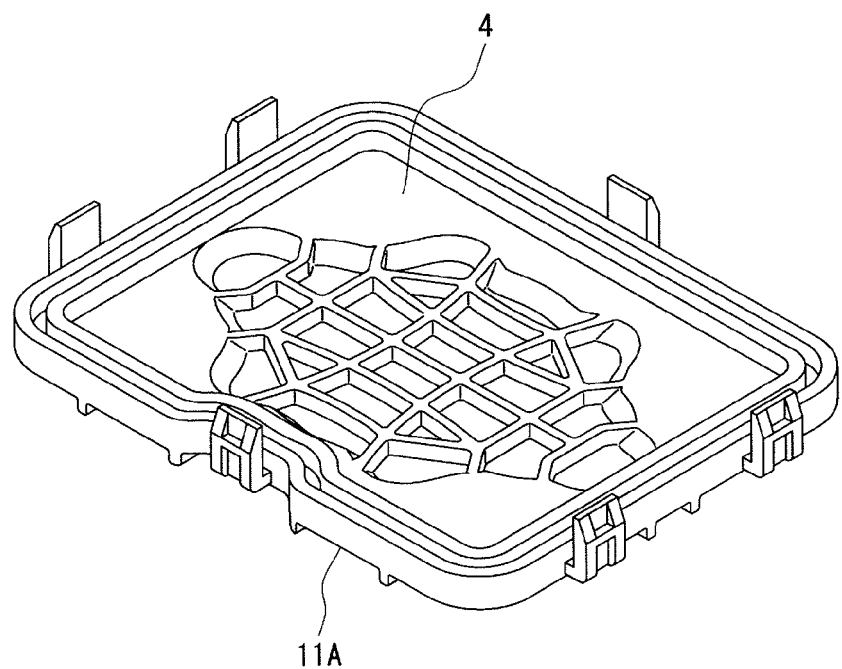

For example, as shown in FIG. 9, even when the central part of the long side 11A of the tabular portion 4 is bent inwardly, it is possible to apply various aspects including the aforementioned combination of the outline and basic ribs of the swelling portion 13.

According to another embodiment, the rib configuration in the region inside the swelling portion 13 (31A, 31B, 32A, 32B, and 41 to 45) may be formed on the top surface of the swelling portion 13. However, from the standpoint of widely securing the plane configuration on the top surface of the swelling portion 13, it is desirable to form the respective ribs 31A, 31B, 32A, 32B, and 41 to 45 on the undersurface 13a of the swelling portion 13. When a wide plane configuration is secured on the top surface of the swelling portion 13, a predetermined display such as the name of the manufacturer and the product name can be printed or formed on this top surface.

Similarly, according to a further embodiment, the rib configuration in the region outside the swelling portion 13 (ribs 51 to 57) may be formed on the undersurface 14 of the tabular portion 4.

At least one of the respective ribs (31A, 31B, 32A, 32B, 41 to 45, and 51 to 57) of the tabular portion 4 may be provided on a plane different from that of the aforementioned embodiments. For example, it is also possible to form the lateral rib 31B on the undersurface 13a of the swelling portion 13 while forming the lateral rib 31A on the top surface 12 of the swelling portion 13. However, when balance or the like is taken into consideration, the ribs (e.g., lateral ribs 31A and 31B) arranged symmetrically are preferably formed on the same plane.

Second Embodiment

Figure 10A:
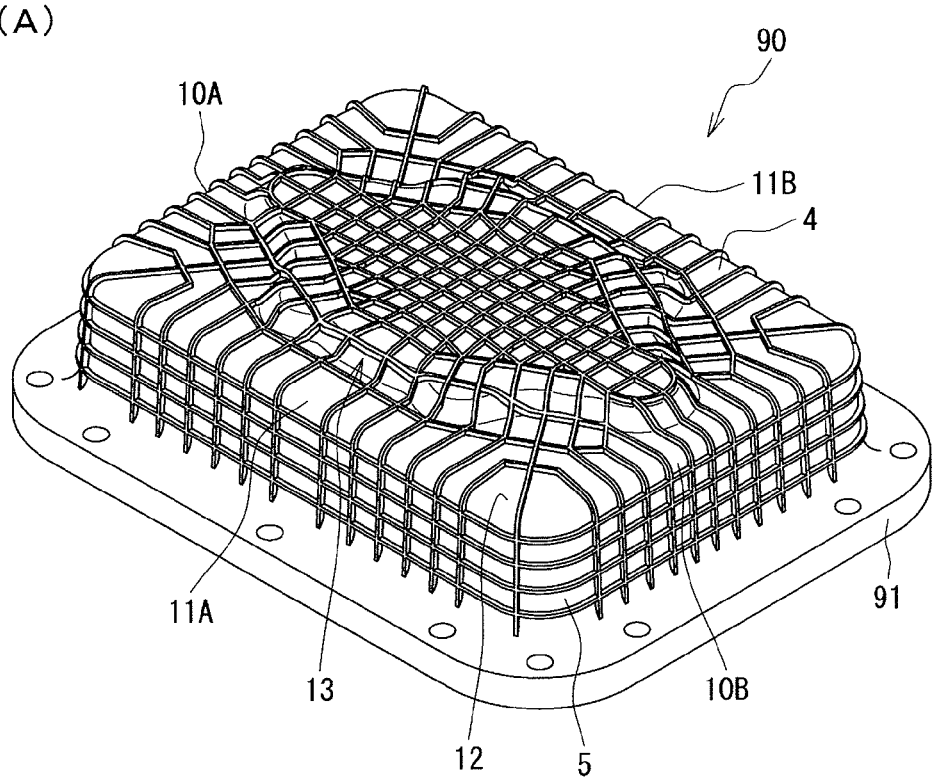
FIG. 10(A) is a perspective view illustrating a bottom surface side of an oil pan according to a second embodiment and FIG. 10(B) is a front view of the oil pan.
Figure 10B:
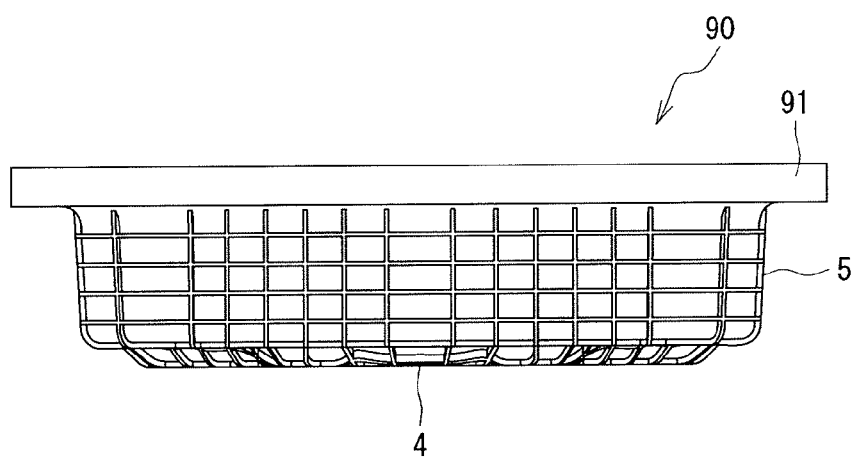
Figure 11:
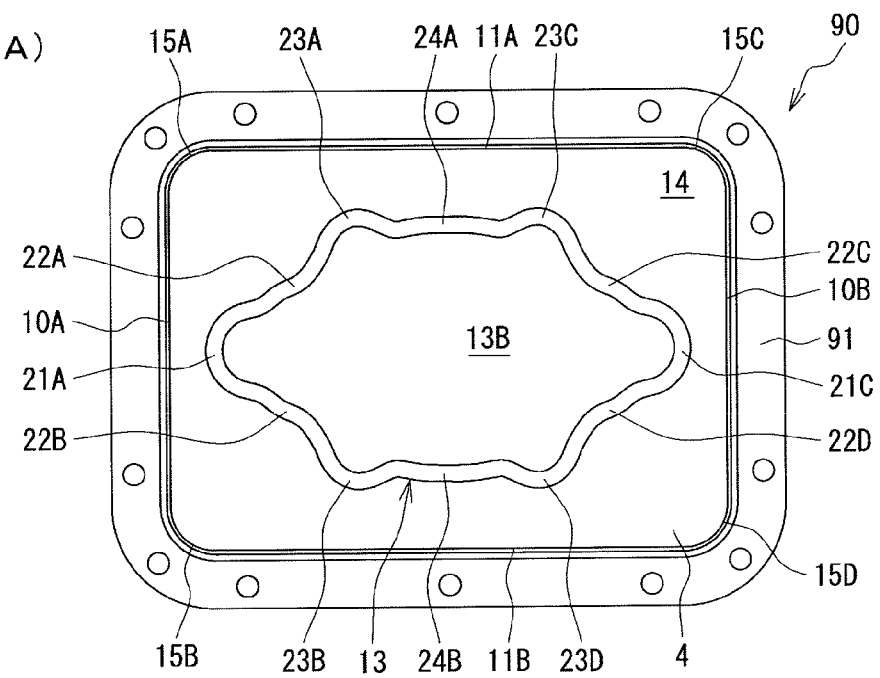
FIG. 11(A) is a plan view of the oil pan in FIGS. 10(A) and 10(B) and FIG. 11(B) is a bottom view of the oil pan in FIGS. 10(A) and 10(B).
Figure 11:
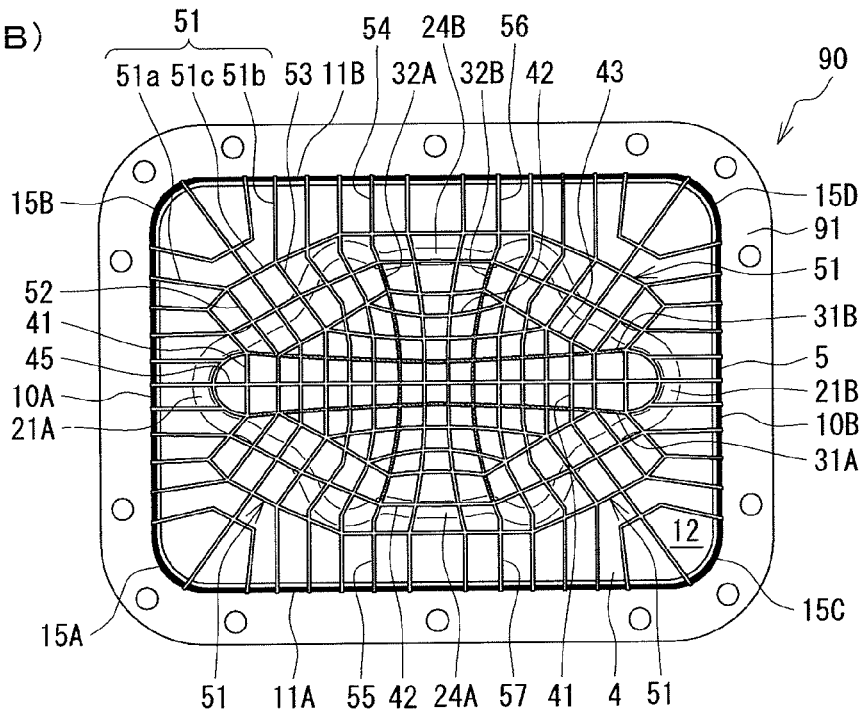

Next, with reference to FIGS. 10 and 11, a case will be described where the structure for enhancing the strength of the substantially rectangular tabular portion of the present invention is applied to an oil pan. A main difference from the first embodiment lies in that the rib configuration in the region inside the swelling portion 13 (31A, 31B, 32A, 32B, and 41 to 45) is formed on the top surface of the swelling portion 13, and that the number of ribs in the tabular portion 4 is increased. Hereinafter, components of the second embodiment common to those of the first embodiment will be assigned the same reference numerals, description thereof will be omitted and description will be given focusing on the differences from the first embodiment.

An oil pan 90 is provided, for example, in a lower part of an automobile engine. The oil pan 90 includes the tabular portion 4 and peripheral wall portion 5 as in the case of the cover 3 of the first embodiment, and also includes a flange portion 91 protruding sideward from an end of the peripheral wall portion 5 opposite to the tabular portion 4, and is configured as a whole as a substantially rectangular parallelepiped member whose lower part is opened. Resin is used as the material of the oil pan 90. Of resin, glass fiber reinforced polyamide 66 or polyamide 6 is preferably used from the standpoint of impact resistance, heat resistance, creeping property, high rigidity and vibration fatigue property. The shape of the oil pan 90 may be constrained by members on the automobile side, but is not particularly limited as long as it has the substantially rectangular tabular portion 4 as in the case of the cover 3 of the first embodiment. For example, the oil pan 90 may also have a shape in which part of the short sides 10A and 10B and long sides 11A and 11B of the tabular portion 4 is dented and does not form a straight line.

The rib configuration inside the swelling portion 13 (31A, 31B, 32A, 32B, and 41 to 45) is formed on the top surface 12 of the swelling portion 13, and all the ribs have the same height and connected to ribs located outside the swelling portion 13. In FIG. 11(B), the lateral ribs 31A and 31B and longitudinal ribs 32A and 32B which are basic ribs are colored in gray to secure viewability of the plurality of ribs. Both ends of the lateral ribs 31A and 31B reach the short-side side crest portions 21A and 21C, and are then connected to the short sides 10A and 10B, and long side 11A via the rib (first outside rib). On the other hand, both ends of the longitudinal ribs 32A and 32B reach the long-side side inter-crest portions 24A and 24B and are then connected to the long sides 11A and 11B via the ribs 54 to 57. There are a total of 14 intermediate ribs 41 connecting the lateral ribs 31A and 31B, some of which extend beyond the lateral ribs 31A and 31B. There are a total of 8 intermediate ribs 42 connecting the longitudinal ribs 32A and 32B, some of which extend beyond the longitudinal ribs 32A and 32B. There are a total of 4 intermediate ribs 43 diagonally connecting the lateral rib 31A or lateral rib 31B and the longitudinal ribs 32A and 32B. Note that the above-described intermediate ribs 44 are not disposed here, but can also be certainly disposed.

Therefore, also in the present embodiment, since the resin-made tabular portion 4 has a combination of specific outline and basic ribs of the swelling portion 13, it is possible to mechanically and synergistically improve the strength of the tabular portion 4. Thus, even when a smallest possible amount of resin material is used for the tabular portion 4 and oil pan 90, it is possible to provide the tabular portion 4 and oil pan 90 useful for securing impact strength resistant to a point load and plane load.

In particular, if a rib configuration is formed on the undersurface 14 of the oil pan 90, oil will be retained between ribs, but the present embodiment is useful in that the rib configuration (31A, 31B, 32A, 32B, 41 to 45, and 51 to 57) is not formed on the undersurface 14 of the tabular portion 4, thus preventing such a phenomenon from occurring. On the other hand, since the rib configuration (31A, 31B, 32A, 32B, 41 to 45, and 51 to 57) is formed on the top surface 12 of the tabular portion 4, it is easier to reduce the pitch between ribs than assumed colliding stones.

The second embodiment as well as the first embodiment is also illustrative for describing the present invention, and not intended to limit the present invention solely to the embodiment and the design thereof can be further modified as appropriate without departing from the scope of the present invention.

OTHER EMBODIMENTS

Although not descried in detail, the present inventor et al. performed similar FEM analyses on and studied various analysis models in addition to the structures according to the first and second embodiments. As a result, it has been confirmed that strength of the tabular portion could be mechanically and effectively enhanced also in aspects described below. Therefore, the present invention can adopt the following aspects.

First, the tabular portion 4 may be substantially polygonal with four or more corners such as pentagonal and hexagonal, and may have an aspect having a substantially polygonal shape with two axes of symmetry substantially orthogonal to each other. That is, the tabular portion 4 may be substantially polygonal (four or more corners) having a first axis of symmetry and a second axis of symmetry substantially orthogonal to each other as in the case of the above-described substantial rectangle. Here, the first axis of symmetry is longer than the second axis of symmetry. The "substantially polygonal (four or more corners)" is a concept including "substantially rectangular".

Regarding the case with the substantially rectangular tabular portion 4, the crest portion and trough portion of the swelling portion 13 have been described based on the relationship between the long side and short side of the substantially rectangle. The case with the substantially polygonal tabular portion 4 will be described using a relationship with the long side or short side as follows. That is, the short-side side crest portions 21A and 21C (turtle head shaped and turtle bottom shaped crest portions) need only to be convex toward the substantially polygonal outline in the direction of the first axis of symmetry. Similarly, the long-side side crest portions 23A to 23D need only to be convex toward the substantially polygonal outline. Furthermore, the corner-side trough portions 22A to 22D need only to be concave toward the substantially polygonal outline in the region sandwiched between the first axis of symmetry and the second axis of symmetry.

Second, for the above-described substantially polygonal (four or more corners) tabular portion 4, an aspect may be adopted in which among the basic ribs (lateral ribs 31A and 31B and longitudinal ribs 32A and 32B), one of the set of the lateral ribs 31A and 31B and the set of the longitudinal ribs 32A and 32B is omitted. In this case, the lateral ribs 31A and 31B may not be disposed line-symmetrically with respect to the first axis of symmetry, or similarly, the longitudinal ribs 32A and 32B may not be disposed line-symmetrically with respect to the second axis of symmetry. However, the lateral ribs 31A and 31B or longitudinal ribs 32A and 32B need to transversely or longitudinally cross the swelling portion so as to spread toward the substantially polygonal outline.

DESCRIPTION OF REFERENCE NUMERALS

1: junction box, 3: cover, 4: tabular portion, 5: peripheral wall portion, 10A, 10B: short side, 11A, 11B: long side, 12: top surface, 13: swelling portion, 13a: undersurface, 14: undersurface, 15A to 15D: corner portion, 21A, 21C: short-side side crest portion, 22A to 22D: corner-side trough portion, 23A to 23D: long-side side crest portion, 24A, 24B: long-side side inter-crest portion, 31A, 31B: lateral rib, 32A, 32B: longitudinal rib, 41 to 44: intermediate rib, 51: corner rib, 52, 53: bridge rib

The invention claimed is:

1. A structure for improving strength of a resin-made substantially polygonal tabular portion,
wherein the polygon comprises a first axis of symmetry and a second axis of symmetry which are substantially orthogonal to each other,
a top surface of the tabular portion comprises a swelling portion provided to swell upward in a region inside a polygonal outline of the tabular portion, an outline of the swelling portion is line-symmetric with respect to the first axis of symmetry and the second axis of symmetry, in a lateral half portion of the outline of the swelling portion, the swelling portion further comprises:

a short-side side crest portion that is convex toward the polygonal outline in a direction of the first axis of symmetry;

a corner-side trough portion that is connected to each end of the short-side side crest portion and concave toward the polygonal outline in a region sandwiched between the first axis of symmetry and the second axis of symmetry; and a long-side side crest portion that is connected to an end opposite to the short-side side crest portion of the each corner-side trough portion and convex toward the polygonal outline, and on one of a top surface and an undersurface of the swelling portion, at least:

a pair of lateral ribs that transversely cross the swelling portion to spread toward the polygonal outline; or a pair of longitudinal ribs that longitudinally cross the swelling portion to spread toward the polygonal outline, are provided.

2. The structure according to claim 1, wherein the structure comprises the lateral ribs and the longitudinal ribs, the lateral ribs are arranged on at least one of the top surface and the undersurface of the swelling portion, and the longitudinal ribs are arranged on at least one of the top surface and the undersurface of the swelling portion.

3. The structure according to claim 2, wherein the lateral ribs and the longitudinal ribs cross each other.

4. The structure according to claim 1, wherein the polygon is a rectangle whose short side extends parallel to the second axis of symmetry and whose long side extends parallel to the first axis of symmetry.

5. The structure according to claim 4, wherein the short-side side crest portion is convex toward the center of the short side.

6. The structure according to claim 4, wherein the corner-side trough portion is concave toward a corner portion at which the short side and the long side cross each other.

7. The structure according to claim 4, wherein the long-side side crest portion is convex toward the long side.

8. The structure according to claim 4, wherein the pair of lateral ribs are arranged to be line-symmetric with respect to the first axis of symmetry.

9. The structure according to claim 8, wherein the pair of lateral ribs transversely cross the swelling portion to spread toward the short side.

10. The structure according to claim 4, wherein the pair of longitudinal ribs are arranged to be line-symmetric with respect to the second axis of symmetry.

11. The structure according to claim 10, wherein the pair of longitudinal ribs longitudinally cross the swelling portion to spread toward the long side.

12. The structure according to claim 4, wherein the long-side side crest portion is most convex toward the long side at a position spaced by a length of approximately ⅓ of the length of the long side from the short side.

13. The structure according to claim 12, wherein in a longitudinal half portion of the outline of the swelling portion, the long-side side crest portion located in the one lateral half portion of the outline and the long-side side crest portion located in the other lateral half portion of the outline are connected via a long-side side inter-crest portion, and the long-side side inter-crest portion is convex toward the center of the long side, an amount of protrusion of the long-side side inter-crest portion toward the long side being smaller than an amount of protrusion of the long-side side crest portions toward the long side.

14. The structure according to claim 4, wherein in a region outside the swelling portion:

a first outside rib that extends to connect both ends of the lateral ribs to at least one of the short side and the long side; and a second outside rib that extends to connect both ends of the longitudinal ribs to the long side, are provided.

15. The structure according to claim 14, wherein the lateral ribs and the longitudinal ribs are provided on the undersurface of the swelling portion and the first outside rib and the second outside rib are provided on the top surface of the tabular portion.

16. The structure according to claim 14, wherein the lateral ribs and the longitudinal ribs are provided on the top surface of the swelling portion and the first outside rib and the second outside rib are provided on the top surface of the tabular portion.

17. The structure according to claim 4, wherein in the region inside the swelling portion, the swelling portion further comprises:

a plurality of first intermediate ribs that connect the lateral ribs;

a plurality of second intermediate ribs that connect the longitudinal ribs; and a plurality of third intermediate ribs that connect the lateral ribs and the longitudinal ribs.

18. The structure according to claim 17, wherein in the region inside the swelling portion, a fourth intermediate rib, which extends to connect the outline of the swelling portion at a position spaced from the lateral ribs and the longitudinal ribs, is provided.

19. The structure according to claim 4, wherein in the region outside the swelling portion, a corner rib that extends to connect the short side and the long side is provided.

20. The structure according to claim 19, wherein in the region outside the swelling portion, a bridge rib that extends to connect the corner rib and the corner-side trough portion is provided.

21. The structure according to claim 1, wherein the tabular portion has a thickness of 1 to 5 mm.

22. The structure according to claim 1, wherein the lateral rib or the longitudinal rib has a height of 1 to 5 mm and a thickness of 1 to 5 mm.

23. A structure for improving strength of a resin-made substantially rectangular tabular portion whose short side extends in a longitudinal direction and whose long side extends in a lateral direction, wherein a top surface of the tabular portion comprises a swelling portion provided to swell upward in a region inside a substantially rectangular outline of the tabular portion, an outline of the swelling portion is line-symmetric with respect to a longitudinal center line and a lateral center line, in a lateral half portion of the outline of the swelling portion, the swelling portion further comprises:

a short-side side crest portion that is convex toward the center of the short side;

a corner-side trough portion that is connected to each end of the short-side side crest portion and concave toward a corner portion at which the short side and the long side cross each other; and a long-side side crest portion that is connected to the each corner-side trough portion and convex toward the long side, on one of a top surface and an undersurface of the swelling portion, at least:

a pair of lateral ribs that are arranged to be line-symmetric with respect to the lateral center line and transversely cross the swelling portion to spread toward the short side; and a pair of longitudinal ribs that are arranged to be line-symmetric with respect to the longitudinal center line and longitudinally cross the swelling portion to spread toward the long side, are provided, and the lateral ribs and the longitudinal ribs cross each other.

24. A substantially rectangular parallelepiped member provided with the structure according to claim 4 or claim 23, wherein a lower part of the substantially rectangular parallelepiped member is opened, the substantially rectangular parallelepiped member comprising:

the tabular portion; and a peripheral wall portion that extends downward from a perimeter of the tabular portion.

25. The substantially rectangular parallelepiped member according to claim 24, wherein the substantially rectangular parallelepiped member constitutes at least part of an oil pan, and the resin is glass fiber reinforced polyamide 66 or polyamide 6.

26. The substantially rectangular parallelepiped member according to claim 24, wherein the substantially rectangular parallelepiped member constitutes at least part of a junction box for a photovoltaic power generation module, and the resin is modified PPE.

* * * * *